(12) United States Patent
Yoshioka et al.

(10) Patent No.: US 12,273,749 B2
(45) Date of Patent: Apr. 8, 2025

(54) TERMINAL AND RADIO COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 322 days.

(21) Appl. No.: 17/620,872

(22) PCT Filed: Jun. 21, 2019

(86) PCT No.: PCT/JP2019/024838
§ 371 (c)(1),
(2) Date: Dec. 20, 2021

(87) PCT Pub. No.: WO2020/255418
PCT Pub. Date: Dec. 24, 2020

(65) Prior Publication Data
US 2022/0353710 A1 Nov. 3, 2022

(51) Int. Cl.
*H04W 24/08* (2009.01)
*H04L 5/00* (2006.01)
(Continued)

(52) U.S. Cl.
CPC .......... *H04W 24/08* (2013.01); *H04L 5/0051* (2013.01); *H04W 16/28* (2013.01); *H04W 72/1273* (2013.01)

(58) Field of Classification Search
CPC ................. H04W 24/08; H04W 16/28; H04W 72/1273; H04W 4/06; H04L 5/0051;
(Continued)

(56) References Cited

U.S. PATENT DOCUMENTS

2016/0043849 A1* 2/2016 Lee .................. H04L 5/0053 370/329
2017/0332377 A1* 11/2017 Tseng ............... H04L 5/0053
(Continued)

FOREIGN PATENT DOCUMENTS

| EP | 3537822 A1 | 9/2019 |
| JP | 2019-062506 A | 4/2019 |
| WO | 2018/084672 A1 | 5/2018 |

OTHER PUBLICATIONS

International Search Report issued in PCT/JP2019/024838 on Jan. 21, 2020 (2 pages).
(Continued)

*Primary Examiner* — Candal Elpenord
(74) *Attorney, Agent, or Firm* — Osha Bergman Watanabe & Burton LLP

(57) ABSTRACT

A terminal includes a receiving section that receives cell-specific or terminal-specific configuration information related to a physical downlink control channel, and a control section that controls, on the basis of the configuration information, a configuration of a search space set to monitor a physical downlink control channel to schedule a physical downlink shared channel associated with a multicast traffic channel. Therefore, it is possible to appropriately control monitoring of a physical downlink control channel to schedule a physical downlink shared channel to transfer multicast data.

6 Claims, 15 Drawing Sheets

(51) Int. Cl.
*H04W 16/28* (2009.01)
*H04W 72/12* (2023.01)
*H04W 72/1273* (2023.01)

(58) Field of Classification Search
CPC ..... H04L 5/001; H04L 5/0023; H04L 5/0048; H04L 5/0094; H04L 5/0053
USPC .................................................. 370/329–330
See application file for complete search history.

(56) References Cited

U.S. PATENT DOCUMENTS

| | | | |
|---|---|---|---|
| 2018/0279135 A1* | 9/2018 | Hwang | H04W 72/23 |
| 2019/0342907 A1* | 11/2019 | Huang | H04W 72/23 |
| 2020/0187170 A1* | 6/2020 | Shin | H04J 11/00 |
| 2020/0229092 A1* | 7/2020 | Wu | H04W 76/11 |
| 2020/0413356 A1* | 12/2020 | Wang | H04W 72/046 |

OTHER PUBLICATIONS

Written Opinion of the International Searching Authority issued in PCT/JP2019/024838 on Jan. 21, 2020 (4 pages).
Sony; "Considerations on Multi-TRP/Panel Transmission"; 3GPP TSG RAN WG1 Meeting #97, R1-1906838; Reno, USA; May 13-17, 2019 (5 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

```
PDCCH-ConfigCommon ::=         SEQUENCE {
    controlResourceSetZero           ControlResourceSetZero
    commonControlResourceSet         ControlResourceSet
    searchSpaceZero                  SearchSpaceZero
    commonSearchSpaceList            SEQUENCE (SIZE(1..4+n)) OF SearchSpace
    searchSpaceSIB1                  SearchSpaceId
    searchSpaceOtherSystemInformation SearchSpaceId
    pagingSearchSpace                SearchSpaceId
    ra-SearchSpace                   SearchSpaceId
    multicastSearchspace             SearchSpaceId
    ...
    multicastTransmission            SetupRel{MulticastTransmission}
}

MulticastTransmission ::=      SEQUENCE {
    Group-RNTI                       RNTI-Value
    ...
    dci-PayloadSize                  INT (0..maxINT-DCI-PayloadSize)
    multicast-ConfigurationPerServingCell SEQUENCE (SIZE
(1..maxNrofServingCells)) OF multicast-ConfigurationPerServingCell,
} multicast-ConfigurationPerServingCell ::= SEQUENCE {
    servingCellId                    ServCellIndex,
}
```

FIG. 6

```
PDCCH-Config ::=                         SEQUENCE {
    controlResourceSetToAddModList       SEQUENCE(SIZE (1..3)) OF ControlResourceSet
    controlResourceSetToReleaseList      SEQUENCE(SIZE (1..3)) OF ControlResourceSetId
    searchSpacesToAddModList             SEQUENCE(SIZE (1..10)) OF SearchSpace
    searchSpacesToReleaseList            SEQUENCE(SIZE (1..10)) OF SearchSpaceId
    multicastTransmission                SetupRel{MulticastTransmission}
    downlinkPreemption                   SetupRelease { DownlinkPreemption }
    tpc-PUSCH                            SetupRelease { PUSCH-TPC-CommandConfig }
    tpc-PUCCH                            SetupRelease { PUCCH-TPC-CommandConfig }
    tpc-SRS                              SetupRelease { SRS-TPC-CommandConfig}
    ...
}
```

```
MulticastTransmission ::=            SEQUENCE {
    Group-RNTI                       RNTI-Value
    ...
    dci-PayloadSize                  INT    (0..maxINT-DCI-PayloadSize)
    multicast-ConfigurationPerServingCell  SEQUENCE (SIZE
(1..maxNrofServingCells)) OF multicast-ConfigurationPerServingCell,
} multicast-ConfigurationPerServingCell ::= SEQUENCE {
    servingCellId                         ServCellIndex,
    ...
}
```

FIG. 8

```
SearchSpace ::=               SEQUENCE {
    searchSpaceId                 SearchSpaceId,
    controlResourceSetId          ControlResourceSetId
    monitoringSlotPeriodicityAndOffset    CHOICE {
        ...}
    duration                      INTEGER (2..2559)
    monitoringSymbolsWithinSlot   BIT STRING (SIZE (14))
    nrofCandidates                SEQUENCE {
        ...}
    searchSpaceType               CHOICE {
        common                        SEQUENCE {
            dci-Format0-0-AndFormat1-0    SEQUENCE {
                ...}
            dci-Format2-0                 SEQUENCE {
                nrofCandidates-SFI            SEQUENCE {
                    ...},
                ...},
            dci-Format2-1                 SEQUENCE {
                ...}
            dci-Format2-2                 SEQUENCE {
                ...}
            dci-Format2-3                 SEQUENCE {
                ...}
            dci-multicast                 SEQUENCE {
                ...}
        },
        ue-Specific                   SEQUENCE {
            dci-Formats                   ENUMERATED {formats0-0-And-1-0, formats0-1-And-1-1},
            ...
        }
    }
}
```

FIG. 9

TERMINAL AND RADIO COMMUNICATION METHOD

TECHNICAL FIELD

The present disclosure relates to a terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (hereinafter also referred to as NR), performing multicast transmission (also referred to as, for example, a multicast traffic channel (MTCH), multicast data, or the like for a logical channel) by using a physical downlink shared channel (e.g., a Physical Downlink Shared Channel (PDSCH)) is under study. Specifically, it is studied that the MTCH is mapped to a downlink shared channel (e.g., a Downlink Shared Channel (DL-SCH)) being a transport channel and the DL-SCH is mapped to the PDSCH.

It is studied that the PDSCH used for the multicast transmission is scheduled by a physical downlink control channel (e.g., a PDCCH) in which cyclic redundancy check (CRC) bits are scrambled (CRC-scrambled) by a radio network temporary identifier (RNTI) common to one or more terminals. The RNTI may be referred to as a group (G)-RNTI, a single cell (SC)-RNTI, a multicast (M or MC)-RNTI, a groupcast RNTI, and so on.

In this case, how a UE controls monitoring of the PDCCH scheduled by the G-RNTI (also referred to as the PDCCH to schedule the PDSCH to transfer multicast data, the PDCCH to schedule multicast data, and so on) is an issue.

Thus, an object of the present invention is to provide a terminal and a radio communication method that can appropriately control monitoring of a physical downlink control channel to schedule a physical downlink shared channel to transfer multicast data.

Solution to Problem

A terminal according to one aspect of the present disclosure includes a receiving section that receives cell-specific or terminal-specific configuration information related to a physical downlink control channel, and a control section that controls, on the basis of the configuration information, a configuration of a search space set to monitor a physical downlink control channel to schedule a physical downlink shared channel associated with a multicast traffic channel.

Advantageous Effects of Invention

According to one aspect of the present disclosure, it is possible to appropriately control monitoring of a physical downlink control channel to schedule a physical downlink shared channel to transfer multicast data.

BRIEF DESCRIPTION OF DRAWINGS

FIG. 6 is a diagram to show an example of cell-specific PDCCH information according to a first aspect;

FIG. 8 is a diagram to show an example of UE-specific PDCCH information according to the first aspect;

FIG. 9 is a diagram to show an example of SS configuration information according to the first aspect;

DESCRIPTION OF EMBODIMENTS (UE State)

Figure 1:
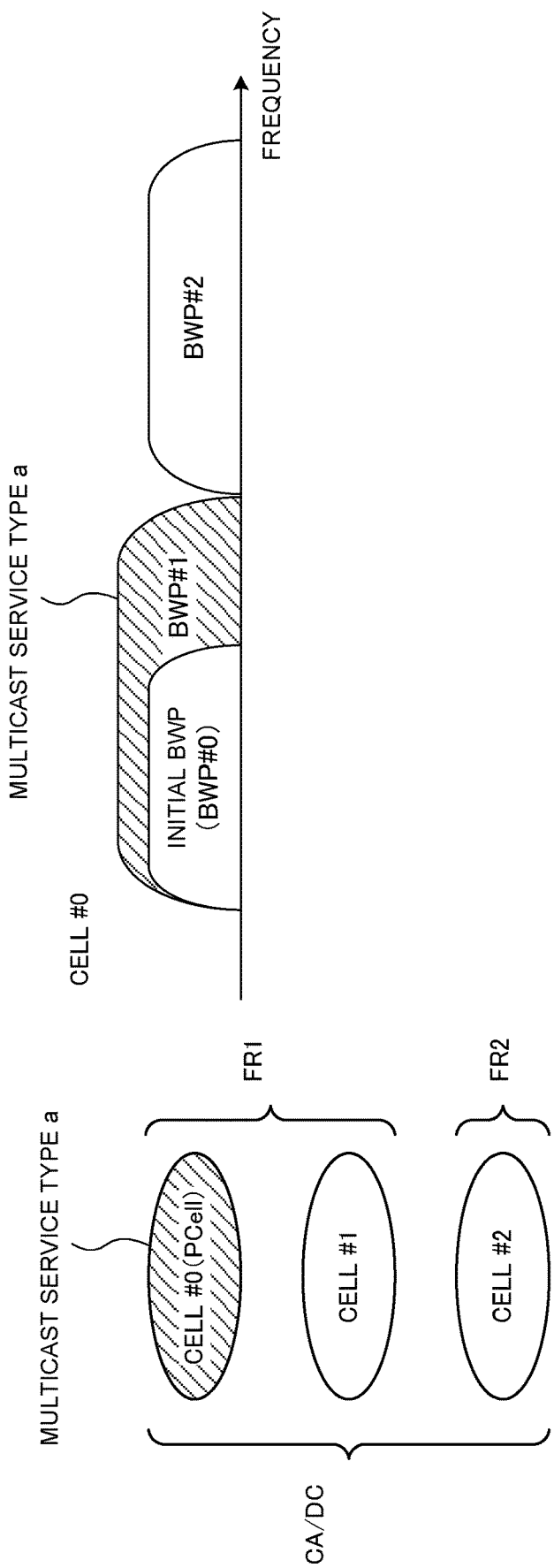
FIG. 1 is a diagram to show an example of multicast transmission in a single cell.

In future radio communication systems (hereinafter also referred to as NR), it is assumed that a terminal (also referred to as a user terminal, User Equipment (UE), a device, and so on) has a plurality of states depending on traffic activity.

For example, the UE of NR may have three states such as an idle state, an inactive state, and a connected state in a radio resource control (RRC) layer. The states are also referred to as UE states, RRC states, and so on.

Here, the idle state is a state in which RRC connection between the UE and a base station is not established, and is also referred to as an RRC idle state (RRC_IDLE state), RRC idle (RRC_IDLE), and so on. The UE in the idle state is required to perform a reconfiguration of the RRC connection in order to transit to the connected state in which data transfer can be performed.

The inactive state is a state in which the RRC connection between the UE and the base station is established, but data transfer cannot be performed, and is also referred to as an RRC inactive state (RRC_INACTIVE state), RRC inactive (RRC_INACTIVE), and so on. The RRC connection is established for the UE in the inactive state, and thus the UE in the inactive state can transit to the connected state quicker than the UE in the idle state. Therefore, delay time until a start of data transfer is shorter than that of the UE in the idle state.

The connected state is a state in which the RRC connection between the UE and the base station is established and data transfer can be performed, and is also referred to as an RRC connected state (RRC_CONNECTED state), RRC connected (RRC_CONNECTED), and so on. The UE in the connected state monitors a downlink control channel (e.g., a Physical Downlink Control Channel (PDCCH)) for determination of whether data is scheduled, and thus power consumption of the UE is larger as compared to that of the UE in the idle state or inactive state.

(Frequency Range)

For NR, supporting a plurality of frequency ranges (FRs) is also under study. For example, a first FR (FR 1) is from 410 MHz to 7.125 GHz. A second FR (FR 2) is from 24.25 GHz to 52.6 GHz. A third FR (FR 3) is from 7.125 GHz to 24.25 GHz. A fourth FR (FR 4) is from 52.6 GHz to 114.25 GHz. The UE may support at least one of the plurality of FRs.

(Multicast)

For NR, supporting unicast being a Point To Point (PTP) communication scheme and multicast being a Point To Multipoint (PTM) communication scheme is also under study.

In the multicast, identical contents are transmitted to one or more terminals (also referred to as user terminals, User Equipments (UEs), devices, and so on) located in a specific area (also referred to as, for example, a Multimedia Broadcast Multicast Service (MBMS) service area and so on). The specific area may be constituted by a single cell or a plurality of cells. The multicast in which the specific area is constituted by a single cell may be referred to as single cell (SC)-based PTM (SC-PTM) and so on.

Multicast transmission and unicast transmission may be performed (may be time-multiplexed) in different time units (e.g., slots) in an identical cell. A time unit for performing multicast transmission in a radio frame may be determined in advance by specifications, or may be configured (notified) for the UE by higher layer signaling.

Note that in the present disclosure, it is only necessary that the higher layer signaling is, for example, at least one of Radio Resource Control (RRC) signaling, system information (e.g., at least one of Remaining Minimum System Information (RMSI), Other system information (OSI), and System Information Block (SIB)), broadcast information (e.g., Physical Broadcast Channel (PBCH) or Master Information Block (MIB)), Medium Access Control (MAC) signaling, and Radio Link Control (RLC) signaling.

Alternatively, each of multicast transmission and unicast transmission may be performed in a different cell. The UE that can perform carrier aggregation (CA) or dual connectivity (DC) may receive multicast transmission in a certain cell, and may receive or transmit unicast transmission in another cell. Note that the UE that does not perform CA or DC may receive multicast transmission by being handed over to a cell in which multicast transmission is performed.

Note that the cell may be rephrased as a serving cell, a component carrier (CC), a carrier, and so on.

In multicast transmission, a multicast traffic channel (MTCH) or an MTCH and a multicast control channel (MCCH) may be used as a logical channel.

On the MTCH, data to be multicast-transmitted (also referred to as multicast data or traffic and so on) may be transferred. On the MCCH, control information necessary for MTCH reception may be transferred. Note that in the SC-PTM, the MTCH and MCCH may be referred to as an SC-MTCH and SC-MCCH or the like, respectively.

The MTCH and MCCH being the logical channel may be mapped to a downlink shared channel (DL-SCH) being a transport channel in a Medium Access Control (MAC) layer. The DL-SCH may be mapped to a physical downlink shared channel (PDSCH) being a physical channel in a physical (PHY) layer.

Note that in unicast transmission, for example, a dedicated traffic channel (DTCH), a dedicated control channel (DCCH), and the like may be used as the logical channel. The DTCH and DCCH may be mapped to the DL-SCH in the MAC layer, and the DL-SCH may be mapped to the PDSCH in the physical layer. As described above, multicast transmission and unicast transmission may be associated with an identical type transport channel and physical channel (in other words, the DL-SCH and PDSCH).

<Multicast Transmission in BWP Unit>

In NR, provision of one or more partial bands (bandwidth parts (BWPs)) in a cell is assumed. Thus, in NR, multicast transmission may be performed in not only a cell unit but also a BWP unit in the cell. An identical type multicast transmission may be performed between different BWPs in the cell, or multicast transmission with at least one different type multicast transmission may be performed between different BWPs in the cell.

FIG. 1 is a diagram to show an example of multicast transmission in the single cell. In FIG. 1, for example, it is assumed that the UE performs CA or DC using a plurality of cells (here, cells #0 to #2). Here, in cell #0 being a PCell, it is assumed that a certain type (here, type a) multicast transmission is supported.

As shown in FIG. 1, one or more BWPs (here, BWPs #0 to #2) are included in cell #0. In at least one BWP (here, BWP #1) in cell #0, multicast transmission may be supported. For example, in FIG. 1, type a multicast transmission is supported in BWP #1 in cell #0.

Note that FIG. 1 is merely an illustrative example, and the number, types, and the like of BWPs in which multicast transmission is supported in a single cell are not limited to those illustrated in the drawing. In FIG. 1, cells #0 and #1 are provided in FR 1 and cell #2 is provided in FR 2, but these are merely examples, and are not limited to those illustrated in the drawing. For example, cells #0 to #2 may belong to an identical FR, or at least two of cells #0 to #2 may belong to FRs different from each other.

Figure 2:
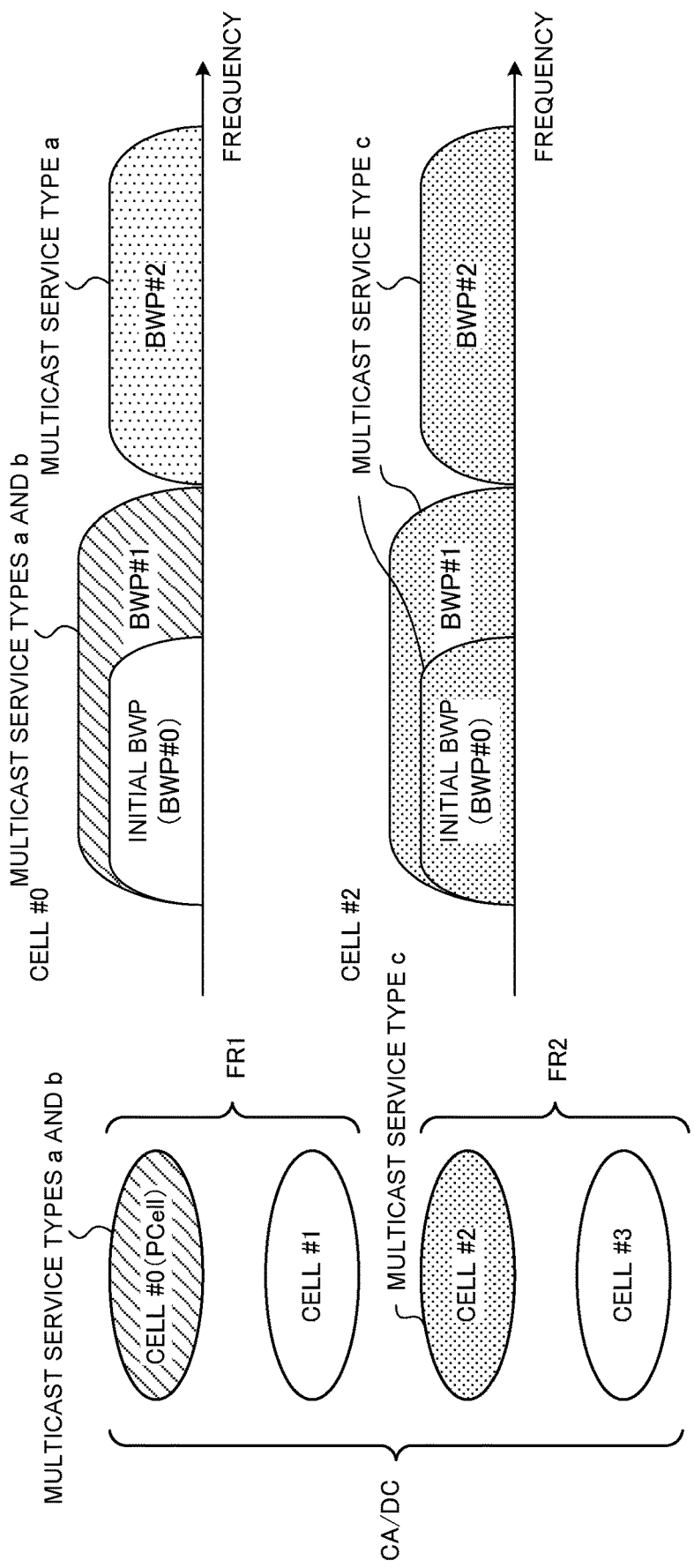
FIG. 2 is a diagram to show an example of multicast transmission in a plurality of cells.

FIG. 2 is a diagram to show an example of multicast transmission in the plurality of the cells. In FIG. 2, for example, it is assumed that the UE performs CA or DC using a plurality of cells (here, cells #0 to #3). Here, in cells #0 and #2 being PCells, it is assumed that one or more types multicast services are supported.

For example, in FIG. 2, a type a multicast service and type b multicast service are supported in cell #0, and a type c multicast service is supported in cell #2. The type a multicast service and type b multicast service are supported in BWP #1 for cell #0, whereas the type a multicast service is supported and the type b multicast service is not supported in BWP #2. In BWPs #0 to #2 for cell #2 of FIG. 2, an identical type c multicast service may be supported.

At least one of types supported in each cell supporting multicast transmission may be supported in each BWP in each cell. Types to be supported between BWPs in an identical cell may be identical to each other, or may be different from each other.

Note that FIG. 2 is merely illustrative example, and the number of cells supporting a multicast service and the number, types, and the like of BWPs in which a multicast service is supported in each cell are not limited to those illustrated in the drawing. In FIG. 2, although cells #0 and #1 are in FR 1, cells #2 and #3 are in FR 2, and a cell supporting a multicast service for each FR is provided, which is merely an illustrative example, and the present disclosure is not limited to those illustrated in the drawing. For example, a cell supporting a multicast service for each cell group may be provided.

<Scheduling of Multicast Transmission>

Multicast transmission may be supported by at least one group of the following groups determined on the basis of a UE state (RRC state).

(1) a group including only UE(s) in a specific UE state (e.g., the idle state, inactive state, or connected state),
(2) any one of a group including UE(s) in a first UE state (e.g., at least one of the idle state and inactive state (idle/inactive state)) or a group including UE(s) in a second UE state (e.g., the connected state), and
(3) supporting both of a first group including UE(s) in a first UE state (e.g., the idle/inactive state) and a second group including UE(s) in a second UE state (e.g., the connected state).

Scheduling of multicast transmission for the groups (e.g., the above-described (1) to (3)) as described above will be described. For example, three scheduling methods below are assumed.

Figure 3:
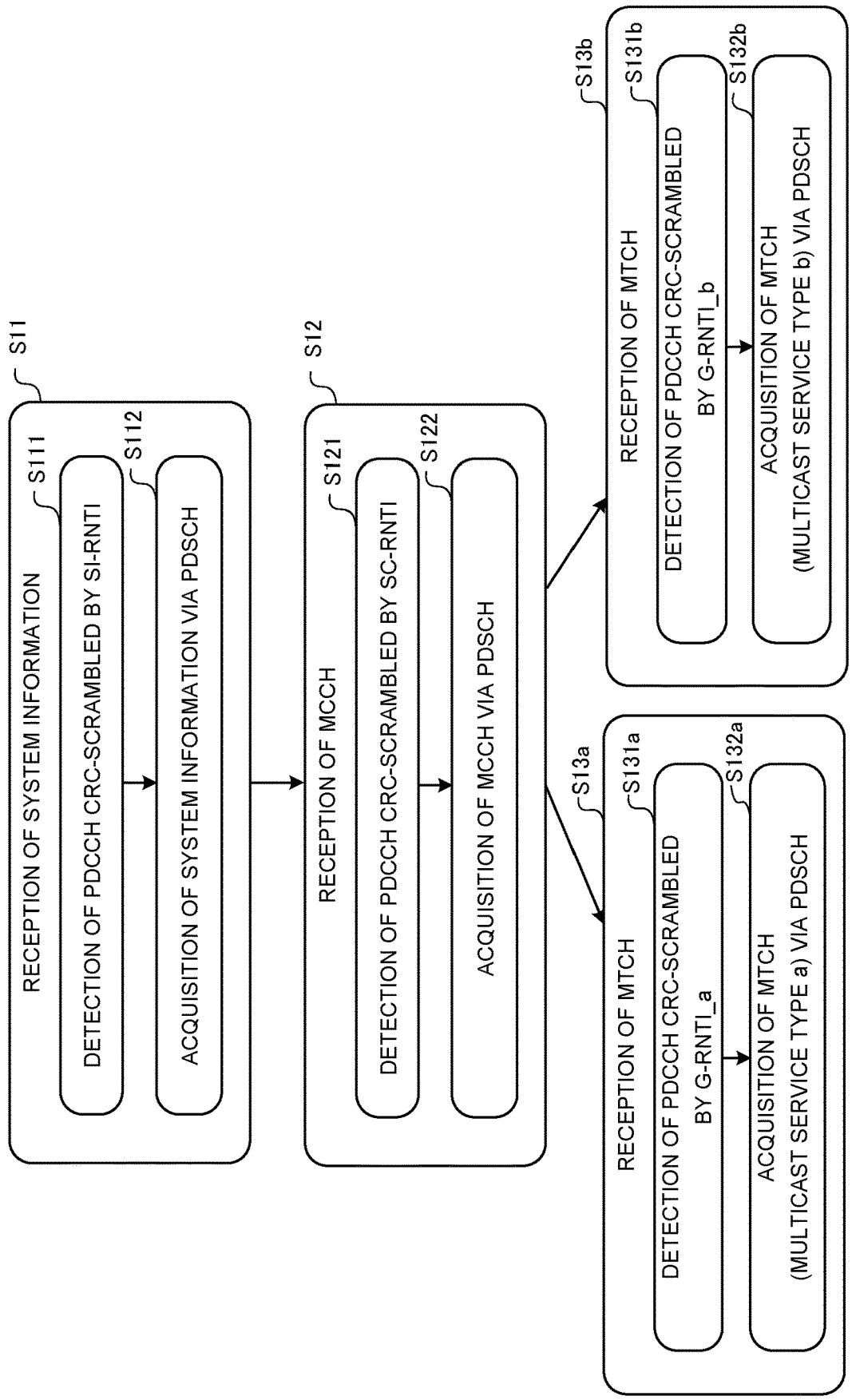
FIG. 3 is a diagram to show an example of first scheduling of multicast transmission.

In first scheduling, the UE may receive system information for multicast (e.g., step S11 of FIG. 3), may receive an MCCH on the basis of configuration information (MCCH configuration information) related to the MCCH included in the system information (e.g., step S12 of FIG. 3), and may receive an MTCH on the basis of information (e.g., configuration information (MTCH configuration information) related to the MTCH) transferred on the MCCH or configuration information (multicast configuration information) related to multicast (e.g., step S13 of FIG. 3). The UE may be at least one of a UE in the idle state, a UE in the inactive state, and a UE in the connected state.

Figure 4:
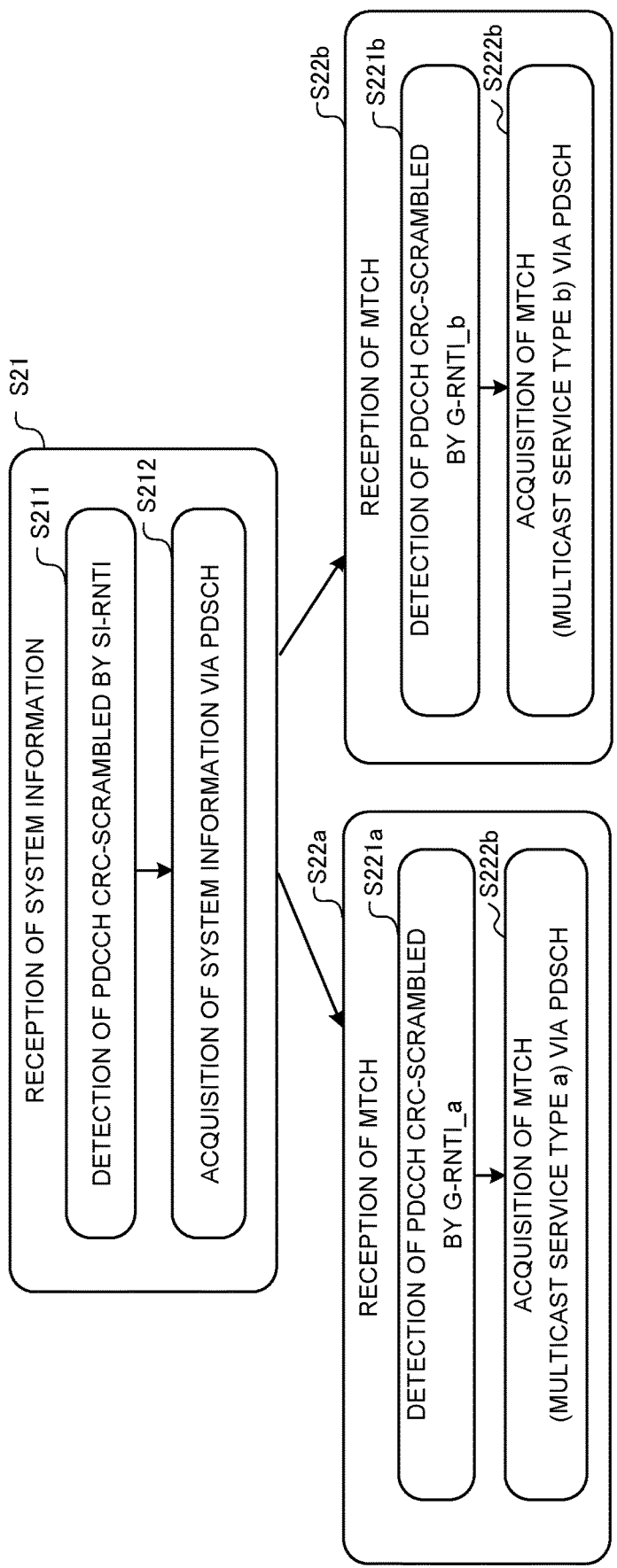
FIG. 4 is a diagram to show an example of second scheduling of multicast transmission.

In second scheduling, the UE may receive system information for multicast (e.g., step S21 of FIG. 4), and may receive an MTCH on the basis of information (e.g., MTCH configuration information or multicast configuration information) included in the system information (e.g., step S22 of FIG. 4). The UE may be at least one of a UE in the idle state, a UE in the inactive state, and a UE in the connected state.

Figure 5:
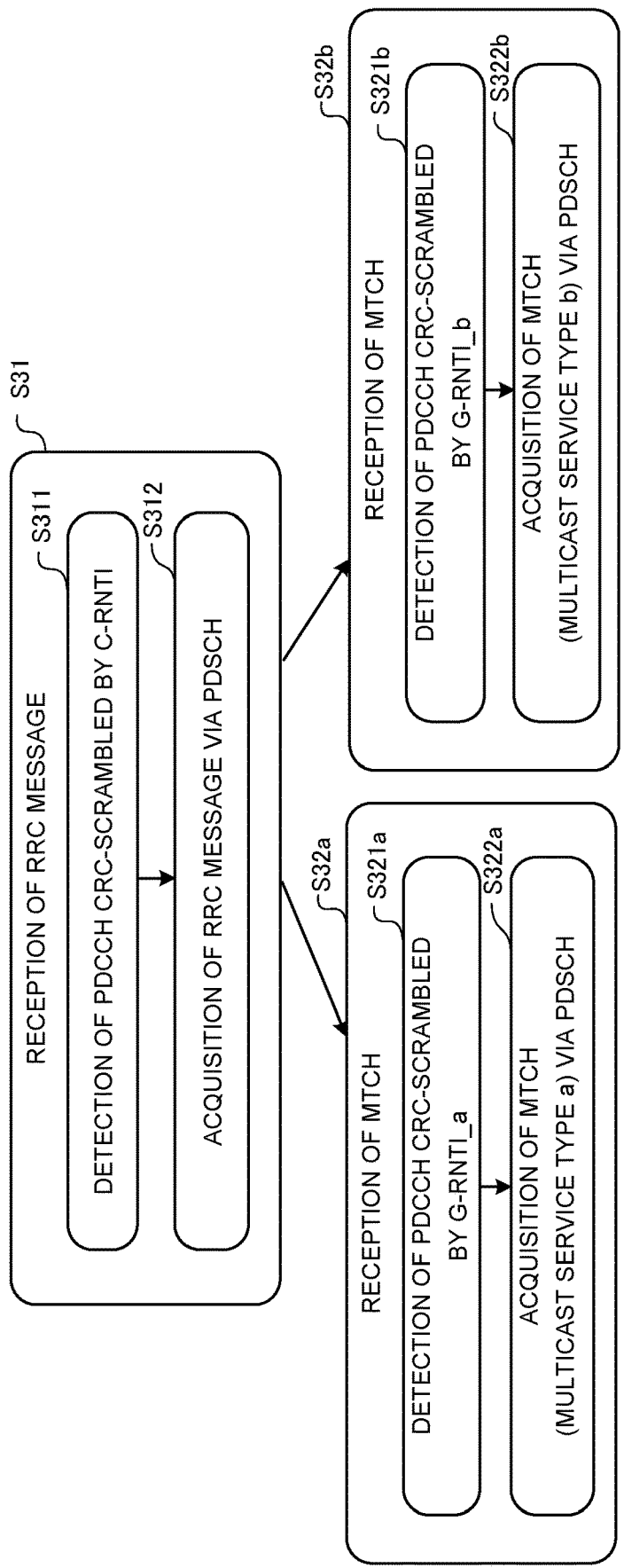
FIG. 5 is a diagram to show an example of third scheduling of multicast transmission.

In third scheduling, the UE may receive an RRC message (e.g., an RRC reconfiguration message) (e.g., step S31 of FIG. 5), and may receive an MTCH on the basis of information (e.g., MTCH configuration information or multicast configuration information) included in the RRC message (e.g., step S32 of FIG. 5). The UE may be a UE in the connected state.

In the first to third scheduling, the UE may receive the above-described MTCH via a PDSCH scheduled by DCI CRC-scrambled by a specific radio network temporary identifier (RNTI).

The specific RNTI may be an RNTI for each multicast transmission (each multicast transmission type). The specific RNTI may be referred to as, for example, a group (G)-RNTI, a single cell (SC)-RNTI, a multicast (M or MC)-RNTI, a groupcast RNTI, and so on. A value of the G-RNTI may be the same between UEs belonging to an identical group (e.g., the above-described (1) to (3)).

One or more G-RNTIs may be introduced to a certain UE. Each G-RNTI may be associated with one or more types of multicast transmission supported by the UE in a certain cell or a plurality of cells.

For example, one or more G-RNTIs may be notified to the UE in the idle/inactive state with use of at least one of system information for multicast and L1 signaling (e.g., at least one of information and DCI transferred on an MCCH).

One or more G-RNTIs may be notified to the UE in the connected state with use of at least one of system information for multicast, L1 signaling (e.g., at least one of information and DCI transferred on an MCCH), and RRC signaling.

The maximum number X of G-RNTIs configurable for the certain UE in a certain cell or certain BWP may be determined by specifications, or may be configured on the basis of a UE capability. For example, the maximum number X of G-RNTIs may be configured such that the maximum number X does not exceed the UE capability reported from the UE.

<<First Scheduling>>

FIG. 3 is a diagram to show an example of the first scheduling of multicast transmission. The first scheduling shown in FIG. 3 may be applied to a group including at least the UE in the idle/inactive state. The group may include the UE in the connected state, or need not include the UE in the connected state.

As shown in FIG. 3, at step S11, the UE may receive system information for multicast (e.g., SIB20). Specifically, at step S111, the UE may monitor a search space (SS) set including one or more search spaces to detect a PDCCH (DCI) CRC-scrambled by a specific RNTI (e.g., a System Information (SI)-RNTI).

At step S112, the UE may acquire the system information via a PDSCH scheduled by the DCI. The system information may include configuration information (MCCH configuration information) related to an MCCH.

The MCCH configuration information may include, for example, at least one of a period (repetition period) of MCCH transmission, time offset, and a period (update period (modification period)) of update of information transferred on the MCCH.

At step S12, the UE receives the MCCH on the basis of the MCCH configuration information in the system information. Specifically, at step S121, the UE may monitor an SS set to detect a PDCCH (DCI) CRC-scrambled by a specific identifier.

The specific identifier may be a specific RNTI (e.g., a Single Cell (SC)-RNTI), or may be a temporary mobile group identifier. The specific identifier may be included in the above-described MCCH configuration information.

At step S122, the UE may acquire the MCCH via the PDSCH scheduled by the DCI. The MCCH may be transmitted repetitively at the above-described repetition period.

Identical information may be transmitted in the MCCH for each repetition period within the update period. When the information transferred on the MCCH is to be changed, this change of information transferred on the MCCH at the next update period may be notified at the last update period. The notification may be referred to as SC-MCCH change notification and so on.

The PDCCH may be used for the notification. The UE may control discontinuous reception (DRX) on the basis of the notification. Specifically, the UE may be activated while the notification is performed, and may transit to a DRX state as long as the information transferred on the MCCH is not changed.

At steps S13a and 13b, the UE receives an MTCH on the basis of information (e.g., configuration information (MTCH configuration information) related to the MTCH) transferred on the MCCH. The information transferred on the MTCH configuration information may include, for example, information indicating at least one of the following.

G-RNTI,
payload size of DCI,
cell corresponding to multicast transmission,
BWP corresponding to multicast transmission,
multicast transmission type supported in each cell or BWP,
control resource set (CORESET) in which PDCCH to schedule PDSCH to transfer MTCH is mapped,
SS set used for monitoring of the PDCCH, and
configuration information (PDSCH configuration information) related to PDSCH to transfer MTCH.

At steps S131a and S131b, the UE may monitor the SS set to detect a PDCCH (DCI) CRC-scrambled by a specific RNTI (e.g., a G-RNTI). Note that the specific RNTI may be a different value for each multicast transmission type. For example, FIG. 3 shows G-RNTI_a corresponding to type a multicast transmission and G-RNTI_b corresponding to type b multicast transmission.

At steps S132a and S132b, the UE may acquire an MTCH corresponding to each of the types a and b via the PDSCH scheduled by the DCI.

Note that steps S13a and 13b, steps S131a and 131b, and steps S132a and 132b are assumed to have different types of multicast transmission, but may include similar behavior.

<<Second Scheduling>>

FIG. 4 is a diagram to show an example of the second scheduling of multicast transmission. The second scheduling shown in FIG. 4 may be applied to a group including at least the UE in the idle/inactive state. The group may include the UE in the connected state, or need not include the UE in the connected state.

Behavior at step S21 of FIG. 4 is similar to that at step S11 of FIG. 3. On the other hand, system information (e.g., SIB20) for multicast acquired at step S212 may include the above-described MTCH configuration information in place of the above-described MCCH configuration information. The information included in the MTCH configuration information is as described in the first scheduling.

At steps S22a and 22b, the UE receives an MTCH on the basis of MTCH configuration information in the system information acquired at step S21. Note that details of steps S22a and S22b are similar to those of steps S13a and S13b of FIG. 3.

<<Third Scheduling>>

FIG. 5 is a diagram to show an example of the third scheduling of multicast transmission. The third scheduling shown in FIG. 5 may be applied to a group including the UE in the connected state. The group does not include the UE in the idle/inactive state.

At step S31 of FIG. 5, the UE may receive the above-described MTCH configuration information via RRC signaling. Specifically, at step S311, the UE may monitor an SS set including one or more search spaces to detect a PDCCH (DCI) CRC-scrambled by a UE-specific RNTI (e.g., a Cell (C)-RNTI).

At step S312, the UE may acquire the MTCH configuration information via the PDSCH scheduled by the DCI. The MTCH configuration information may be included in, for example, an RRC reconfiguration message. The information included in the MTCH configuration information is as described in the first scheduling.

At steps S32a and 32b, the UE receives an MTCH on the basis of MTCH configuration information in the system information acquired at step S31. Note that details of steps S32a and S32b are similar to those of steps S13a and S13b of FIG. 3.

As described above, in NR, the MTCH (multicast data) is received on the basis of the MCCH, system information for multicast, or MTCH configuration information included in the RRC message via the PDSCH scheduled by the PDCCH (DCI) CRC-scrambled by the G-RNTI.

(Search Space Set)

Incidentally, in NR, one or more search space (SS) sets are configured for the UE. The SS sets are a set of candidates of a PDCCH (PDCCH candidates) monitored by the UE. The SS sets are also referred to as PDCCH search space sets, search spaces, and so on.

The UE monitors PDCCH candidates in one or more SS sets. The one or more SS sets may include at least one of an SS set common to one or more UEs (common search space (CSS) set) and a UE-specific SS set (UE-specific search space (USS) set).

The CSS set may include, for example, at least one of the following.

Type 0-PDCCH CSS set,
Type 0A-PDCCH CSS set,
Type 1-PDCCH CSS set,
Type 2-PDCCH CSS set, and
Type 3-PDCCH CSS set.

The type 0-PDCCH CSS set is used for monitoring of a DCI format cyclic redundancy check (CRC)-scrambled by a System Information-Radio Network Temporary Identifier (SI-RNTI) in a certain cell (e.g., a primary cell).

The type 0-PDCCH CSS set may be configured for the UE on the basis of information (e.g., a Radio Resource Control (RRC) parameter "pdcch-ConfigSIB1") in a master information block (MIB) transferred by a broadcast channel (Physical Broadcast Channel (PBCH)).

Alternatively, the type 0-PDCCH CSS set may be configured on the basis of information (e.g., an RRC parameter "searchSpaceSIB1" or "searchSpaceZero") in information related to a cell-specific PDCCH (cell-specific PDCCH information, for example, an RRC parameter "PDCCH-ConfigCommon").

The cell-specific PDCCH information may be notified to the UE by system information (e.g., system information block (SIB) 1) or UE-specific RRC signaling (e.g., configuration information (e.g., an RRC parameter "ReconfigurationWithSync") for synchronization in an RRC reconfiguration message).

The type 0A-PDCCH CSS set is used for monitoring of a DCI format CRC-scrambled by an SI-RNTI in a certain cell (e.g., a primary cell). The type 0A-PDCCH CSS set may be configured on the basis of information (e.g., an RRC parameter "searchSpaceOtherSystemInformation") in cell-specific PDCCH information.

The type 1-PDCCH CSS set is used for monitoring of a DCI format CRC-scrambled by a Random Access (RA)-RNTI or a TC-RNTI in a certain cell (e.g., a primary cell). The type 1-PDCCH CSS set may be configured on the basis of information (e.g., an RRC parameter "ra-SearchSpace") in cell-specific PDCCH information.

The type 2-PDCCH CSS set is used for monitoring of a DCI format CRC-scrambled by a Paging (P)-RNTI in a certain cell (e.g., a primary cell). The type 2-PDCCH CSS set may be configured on the basis of information (e.g., an RRC parameter "pagingSearchSpace") in cell-specific PDCCH information.

The type 3-PDCCH CSS set is used for monitoring of a DCI format CRC-scrambled by a Slot Format Indicator (SFI)-RNTI, an INT-RNTI, a TPC-PUSCH-RNTI, a TPC-PUCCH-RNTI, or a TPC-SRS-RNTI. The type 3-PDCCH CSS set may be configured on the basis of information (e.g., an RRC parameter "SearchSpace") in information related to a UE-specific PDCCH (UE-specific PDCCH information, for example, an RRC parameter "PDCCH-Config"). The UE-specific PDCCH information may be notified to the UE by UE-specific RRC signaling (e.g., an RRC reconfiguration message).

The USS set is used for monitoring of a DCI format CRC-scrambled by a C-RNTI or a CS-RNTI. The USS set may be configured on the basis of information (e.g., an RRC parameter "SearchSpace") in UE-specific PDCCH information.

A control resource set (CORESET) is associated with each SS set as described above. The CORESET may include a plurality of types (e.g., CORESET #0, (cell-specific) CORESET (common CORESET) common to one or more UEs, and UE-specific CORESET (dedicated CORESET)).

CORESET #0 may be configured on the basis of information (e.g., an RRC parameter "ControlResourceSetzero") in the MIB or the above-described cell-specific PDCCH information (e.g., an RRC parameter "PDCCH-ConfigCommon"). CORESET #0 may be associated with either the CSS set or USS set.

The common CORESET may be configured on the basis of information (e.g., an RRC parameter "commonControlResourceSet") in the above-described cell-specific PDCCH information (e.g., the RRC parameter "PDCCH-ConfigCommon"). The common CORESET may be associated with either the CSS set or USS set.

The UE-specific CORESET may be configured on the basis of information (e.g., an RRC parameter "ControlResourceSet") in the above-described UE-specific PDCCH information (e.g., an RRC parameter "PDCCH-Config"). The CORESET may be associated with either the CSS set or USS set. The maximum number of the CORESETs configurable per bandwidth part (BWP) in the cell may be, for example, 3.

Certain duration (PDCCH monitoring occasions, monitoring occasions (MOs), or monitoring duration) with certain periodicity in which each SS set is monitored (blind-decoded) may be configured for the UE. The UE may receive, for each SS set, information indicating periodicity and offset or duration of the monitoring occasions, or the like.

In other words, monitoring occasions for each SS set may be configured for the UE. The UE may monitor PDCCH candidates for the SS set in the CORESET in the configured monitoring occasions. The monitoring occasions may be constituted by one or more slots.

The maximum number of PDCCH candidates that the UE can monitor per cell and per slot may be limited. The maximum number may be determined for each subcarrier spacing μ. For example, when the subcarrier spacing μ is 15 kHz, 30 kHz, 60 kHz, and 120 kHz, the maximum number may be 44, 36, 22, and 20, respectively.

The maximum number of non-overlapping control channel elements (CCEs) may be limited for the UE per cell and per slot. The maximum number may be determined for each subcarrier spacing μ. For example, when the subcarrier spacing p is 15 kHz, 30 kHz, 60 kHz, and 120 kHz, the maximum number may be 56, 56, 48, and 32, respectively.

Note that the CCEs for the PDCCH candidates may be non-overlapping when indices of the CORESET are different from each other or when the first symbols for reception of the PDCCH candidates are different from each other.

As mentioned above, in NR, reception of a PDCCH (DCI) CRC-scrambled by a G-RNTI is necessary for the UE to receive a PDSCH associated with multicast transmission (MTCH or multicast data).

Accordingly, how the UE controls monitoring of the PDCCH scheduled by the G-RNTI (also referred to as the PDCCH to schedule the PDSCH to transfer multicast data, the PDCCH to schedule multicast data, and so on) is an issue.

Thus, the inventors of the present invention studied a method for appropriately controlling monitoring of the PDCCH to schedule the PDSCH to transfer multicast data, and came up with the present invention.

Embodiments according to the present disclosure will be described in detail hereinafter with reference to the drawings. Note that in the present disclosure, multicast transmission, multicast, a multicast service, multicast data, a service related to at least one of multicast and broadcast (multicast/broadcast) or multicast/broadcast, an MBMS, an MTCH, and the like may be interchangeably rephrased.

(First Aspect)

In a first aspect, a CORESET and an SS set used for reception of a PDCCH (PDCCH CRC-scrambled by a G-RNTI) to schedule a PDSCH associated with an MTCH will be described.

<CORESET>

The CORESET used for reception of the PDCCH CRC-scrambled by the G-RNTI may be a multicast transmission-specific CORESET, or may be a CORESET not being multicast transmission-specific (shared CORESET).

<<Multicast Transmission-Specific CORESET>>

The multicast transmission-specific CORESET may be any one of the following.

CORESET for each multicast service type,

CORESET common to a plurality of multicast service types, and

CORESET common to all multicast service types configured or supported for the UE.

Note that in NR Rel. 15, at most three CORESETs can be configured for the UE by higher layer signaling in each DL BWP in a cell. On the other hand, when the multicast transmission-specific CORESET is introduced, the maximum number of CORESETs configurable for each UE may be increased than that of NR Rel. 15. For example, the maximum number may be greater than 3. Alternatively, at most three CORESETs including the multicast transmission-specific CORESET may be configurable for the UE by the higher layer signaling.

<<Shared CORESET>>

The shared CORESET may be at least one of the following.

Common CORESET configured on the basis of information (e.g., the RRC parameter "commonControlResourceSet") in the above-described cell-specific PDCCH information (e.g., the RRC parameter "PDCCH-ConfigCommon"), and UE-specific CORESET configured on the basis of information (e.g., the RRC parameter "ControlResourceSet") in the above-described UE-specific PDCCH information (e.g., the RRC parameter "PDCCH-Config").

For example, when the shared CORESET is the above-described common CORESET, as long as the UE in the idle/inactive state, the shared CORESET may be associated with a CSS set (e.g., at least one of the above-described type 0-PDCCH CSS set, type 0A-PDCCH CSS set, type 1-PDCCH CSS set, and type 2-PDCCH CSS set).

On the other hand, when the shared CORESET is the above-described common CORESET, as long as the UE in the connected state, the shared CORESET may be associated with a CSS set (e.g., at least one of the above-described type 0-PDCCH CSS set, type 0A-PDCCH CSS set, type 1-PDCCH CSS set, type 2-PDCCH CSS set, and type 3-PDCCH CSS set).

<SS Set>

An SS set (SS set for multicast) to monitor the PDCCH CRC-scrambled by the G-RNTI may be at least one of the following.

SS set configured on the basis of the above-described cell-specific PDCCH information (e.g., the RRC parameter "PDCCH-ConfigCommon"), and SS set configured on the basis of information (e.g., an RRC parameter "SearchSpaceToAddModList") in the above-described UE-specific PDCCH information (e.g., the RRC parameter "PDCCH-Config").

<<SS Set for Multicast based on Cell-Specific PDCCH Information>>

FIG. 6 is a diagram to show an example of the cell-specific PDCCH information according to the first aspect. As shown in FIG. 6, the cell-specific PDCCH information (e.g., the RRC parameter "PDCCH-ConfigCommon") may include a list (CSS list, for example, an RRC parameter "commonSearchSpaceList") of configuration information (CSS configuration information, for example, an RRC parameter "SearchSpace") for one or more CSS sets.

The number of pieces of the CSS configuration information included in the above-described CSS list may be 4+n. Here, n (n≥0) may be equal to the number of SS sets for multicast configured for the UE. For example, the SS set for multicast may be any one of the following.

SS set for each multicast service type,
SS set common to a plurality of multicast service types, and
SS set common to all multicast service types configured or supported for the UE.

The cell-specific PDCCH information may include the above-described MTCH configuration information (here, an RRC parameter "MulticastTransmission"). For example, in FIG. 6, the MTCH configuration information includes information (e.g., an RRC parameter "Group-RNTI") indicating the G-RNTI, payload size of DCI (e.g., an RRC parameter "dci-PayloadSize"), and multicast configuration information (e.g., an RRC parameter "multicast-ConfigurationPerServingCell") for each cell, but the present disclosure is not limited these.

Note that the multicast configuration information (e.g., the RRC parameter "multicast-ConfigurationPerServingCell") for each cell may include at least one of cell identification information (e.g., an RRC parameter "servingCellId" or "ServCellIndex"), information indicating a multicast type to be supported, information indicating a BWP to support multicast, information indicating a multicast type to be supported by each BWP, and the like.

Figure 7:
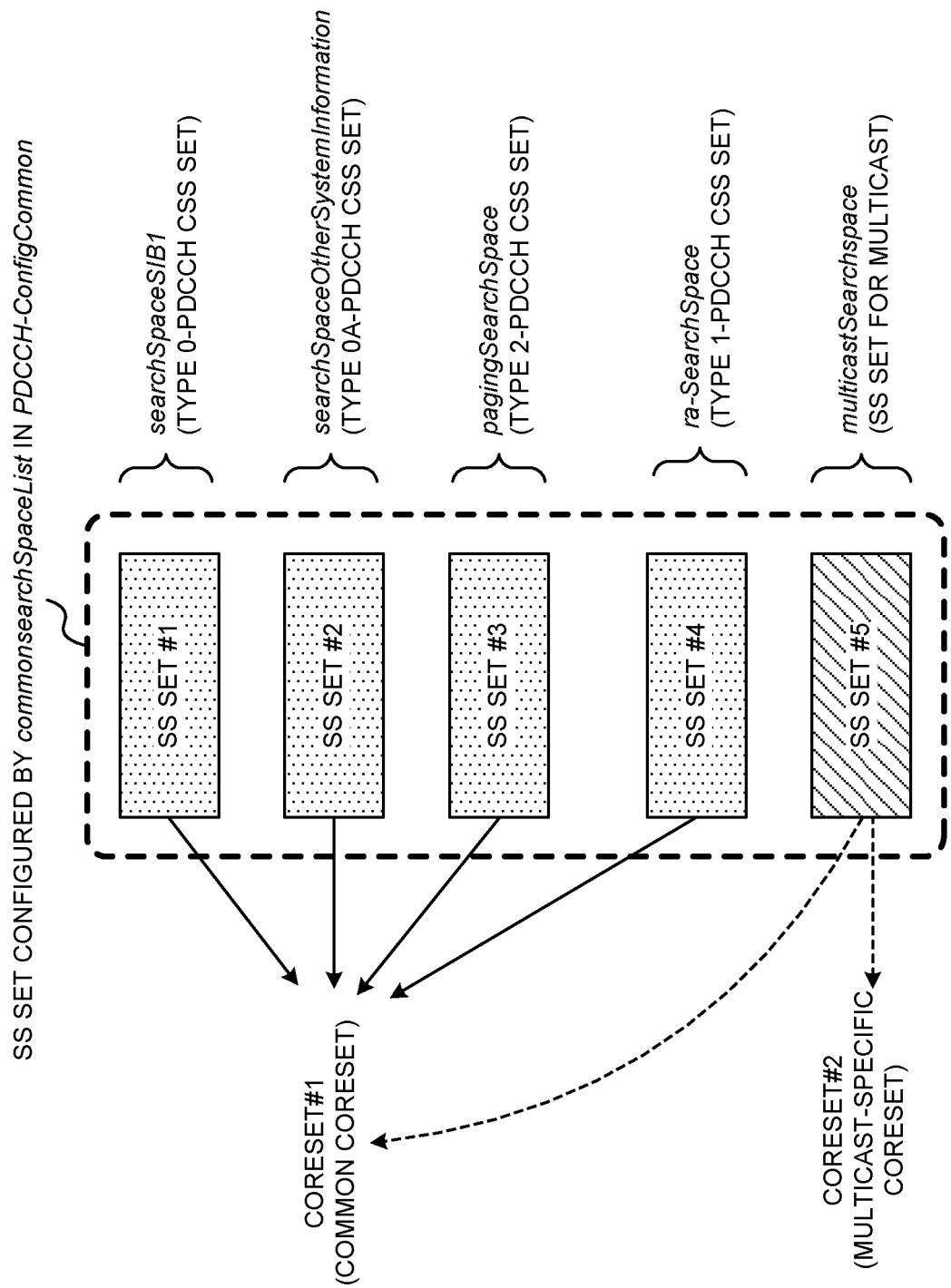
FIG. 7 is a diagram to show an example of a configuration of an SS set for multicast based on the cell-specific PDCCH information according to the first aspect.

FIG. 7 is a diagram to show an example of a configuration of the SS set for multicast based on the cell-specific PDCCH information according to the first aspect. In FIG. 7, for example, it is assumed that SS sets #1 to #5 are configured for the UE by "commonSearchSpaceList" in "PDCCH-ConfigCommon" of FIG. 6 (here, n=1 of FIG. 6).

In FIG. 7, for example, it is assumed that Ids #1 to #5 of SS sets are specified by "searchSpaceSIB1," "searchSpaceOtherSystemInformation," "pagingSearchSpace," "ra-SearchSpace," and "multicastSearchSpace of FIG. 6," respectively. In this case, as shown in FIG. 7, SS set #1 is the type 0-PDCCH CSS set, SS set #2 is the type 0A-PDCCH CSS set, SS set #3 is the type 2-PDCCH CSS set, SS set #4 is the type 1-PDCCH CSS set, and SS set #5 is the SS set for multicast.

As shown in FIG. 7, SS sets #1 to #4 being the type 0/0A/2/1-PDCCH CSS sets may be associated with a common CORESET specified by "commonControlResourceSet" in "PDCCH-ConfigCommon" of FIG. 6. Note that in FIG. 7, all of the type 0/0A/2/1-PDCCH CSS sets are specified, but at least one of the type 0/0A/2/1-PDCCH CSS sets may be specified by the above-described "commonSearchSpaceList" of FIG. 6.

As shown in FIG. 7, SS set #5 being the SS set for multicast may be associated with a common CORESET specified by "commonControlResourceSet" in "PDCCH-ConfigCommon" of FIG. 6 in the same manner as at least one of the type 0/0A/2/1-PDCCH CSS sets.

Alternatively, this SS set #5 may be associated with a multicast-specific CORESET. In this case, the cell-specific PDCCH information (e.g., "PDCCH-ConfigCommon" of FIG. 6) may include information indicating the multicast-specific CORESET.

<<SS Set for Multicast based on UE-Specific PDCCH Information>>

FIG. 8 is a diagram to show an example of the UE-specific PDCCH information according to the first aspect. As shown in FIG. 8, the UE-specific PDCCH information (e.g., an RRC parameter "PDCCH-Config") may include a list (SS list, for example, an RRC parameter "SearchSpacesAddModList") of configuration information (SS configuration information, for example, an RRC parameter "SearchSpace") for one or more SS sets.

The UE-specific PDCCH information may include the above-described MTCH configuration information (here, an RRC parameter "MulticastTransmission"). For example, in FIG. 8, the MTCH configuration information includes information (e.g., an RRC parameter "Group-RNTI") indicating the G-RNTI, payload size of DCI (e.g., an RRC parameter "dci-PayloadSize"), and multicast configuration information (e.g., an RRC parameter "multicast-ConfigurationPerServingCell") for each cell, but the present disclosure is not limited these.

FIG. 9 is a diagram to show an example of SS configuration information according to the first aspect. As shown in FIG. 9, the SS configuration information may include information related to at least one of the following.

SS set identifier (search space ID, for example, an RRC IE "searchSpaceId"),

CORESET identifier (control resource set ID, for example, an RRC IE "controlResourceSetId") associated with the SS set, periodicity and offset (e.g., an RRC IE "monitoringSlotPeriodicityAndOffset") of monitoring occasions including the SS set, duration (e.g., an RRC IE "duration") of monitoring occasions, the number of PDCCH candidates (e.g., an RRC IE "nrofCandidates") for each aggregation level in the SS set, SS set type (search space type, for example, an RRC IE "searchSpaceType"), such as a CSS set or USS set, and DCI format (DCI format information, for example, an RRC IE "dci-Formats") for monitoring in the SS set.

For example, when the above-described DCI format information in the above-described SS configuration information indicates a DCI format for multicast (e.g., an RRC parameter "dci-multicast"), the UE may acknowledge that the SS set configured by the SS configuration information is for multicast.

Figure 10:
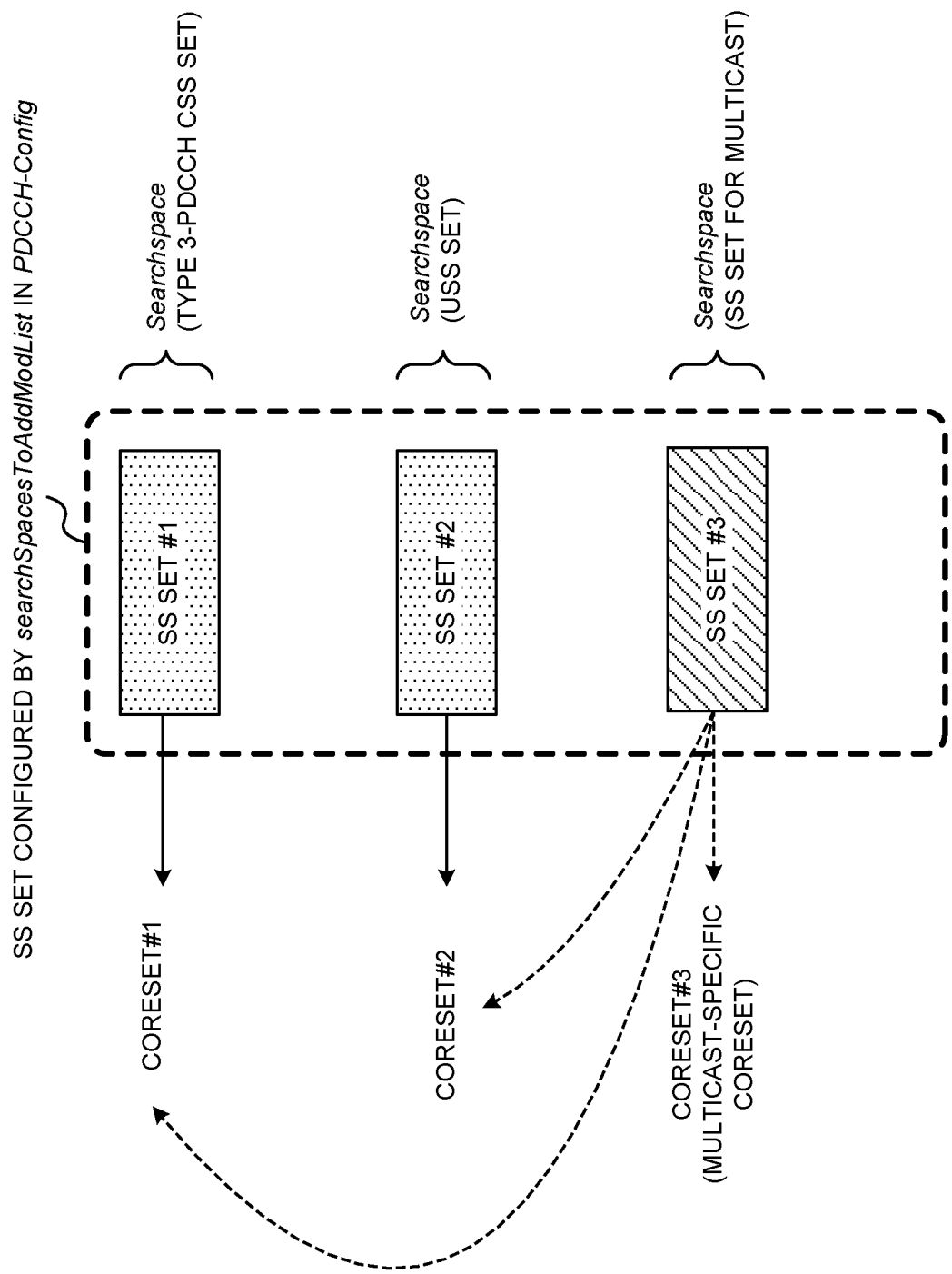
FIG. 10 is a diagram to show an example of a configuration of an SS set for multicast based on the UE-specific PDCCH information according to the first aspect.

FIG. 10 is a diagram to show an example of the configuration of the SS set for multicast based on the UE-specific PDCCH information according to the first aspect. In FIG. 10, for example, it is assumed that SS sets #1 to #3 are configured for the UE by "SearchSpacesAddModList" in "PDCCH-Config" of FIG. 8. Note that the number of SS sets is not limited to this.

In FIG. 10, "searchSpaceType" in "Searchspace" of FIG. 9 for SS set #1 is common (in other words, SS set #1 is the type 3-PDCCH CSS set). It is only necessary that a DCI format monitored in the SS set #1 is any one of DCI formats 0_0 and 1_0, DCI format 2_0, DCI format 2_1, and format 2_3 (see "common" in "searchSpaceType" of FIG. 9).

"searchSpaceType" in "Searchspace" of FIG. 9 for SS set #2 is ue-specific (in other words, SS set #2 is the USS set).

With respect to SS set #3, "SearchSpaceType" in "Searchspace" of FIG. 9 is common and a monitored DCI format is DCI for multicast, and thus SS set #3 is an SS set for multicast. Thus, the SS set for multicast may be specified as a kind of the type 3-PDCCH CSS set.

As shown in FIG. 10, SS set #1 being the type 3-PDCCH CSS set may be associated with one (here, CORESET #1) of CORESETs (common CORESETs specified by "controlResourceSetToAddModList" in "PDCCH-Config" of FIG. 8) specified in the UE-specific PDCCH information. Similarly, SS set #2 being the USS set may also be associated with one (here, CORESET #2) of CORESETs specified in the UE-specific PDCCH information. Note that SS sets #1 and #2 may be associated with an identical CORESET.

As shown in FIG. 10, SS set #3 being the SS set for multicast may be associated with a common CORESET specified by "commonControlResourceSet" in "PDCCH-ConfigCommon" of FIG. 6 in the same manner as the type 3-PDCCH CSS set or USS set.

Alternatively, this SS set #3 may be associated with a multicast-specific CORESET. In this case, the UE-specific PDCCH information (e.g., "PDCCH-ConfigCommon" of FIG. 8) or SS configuration information (e.g., "Searchspace" of FIG. 9) for SS set #3 may include information indicating the multicast-specific CORESET.

According to the first aspect above, at least one of the CORESET and SS set for reception of the PDCCH scrambled by the G-RNTI can be appropriately configured for the UE.

(Second Aspect)

In a second aspect, a behavior for monitoring a PDCCH to schedule a PDSCH (also referred to as multicast data, multicast transmission, and so on) associated with an MTCH will be described.

<UE in Idle/Inactive State>

An SS set to monitor the PDCCH CRC-scrambled by the G-RNTI may be SS set #0, or may be an SS set other than SS set #0.

<<SS Set #0>>

When the SS set to monitor the PDCCH CRC-scrambled by the G-RNTI is SS set #0, the UE in the idle/inactive state may monitor the SS set #0 in PDCCH monitoring occasions determined on the basis of association (so-called default association) between a synchronization signal block (SSB) index (SSB index) and PDCCH monitoring occasion.

Here, the SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

Figure 11:
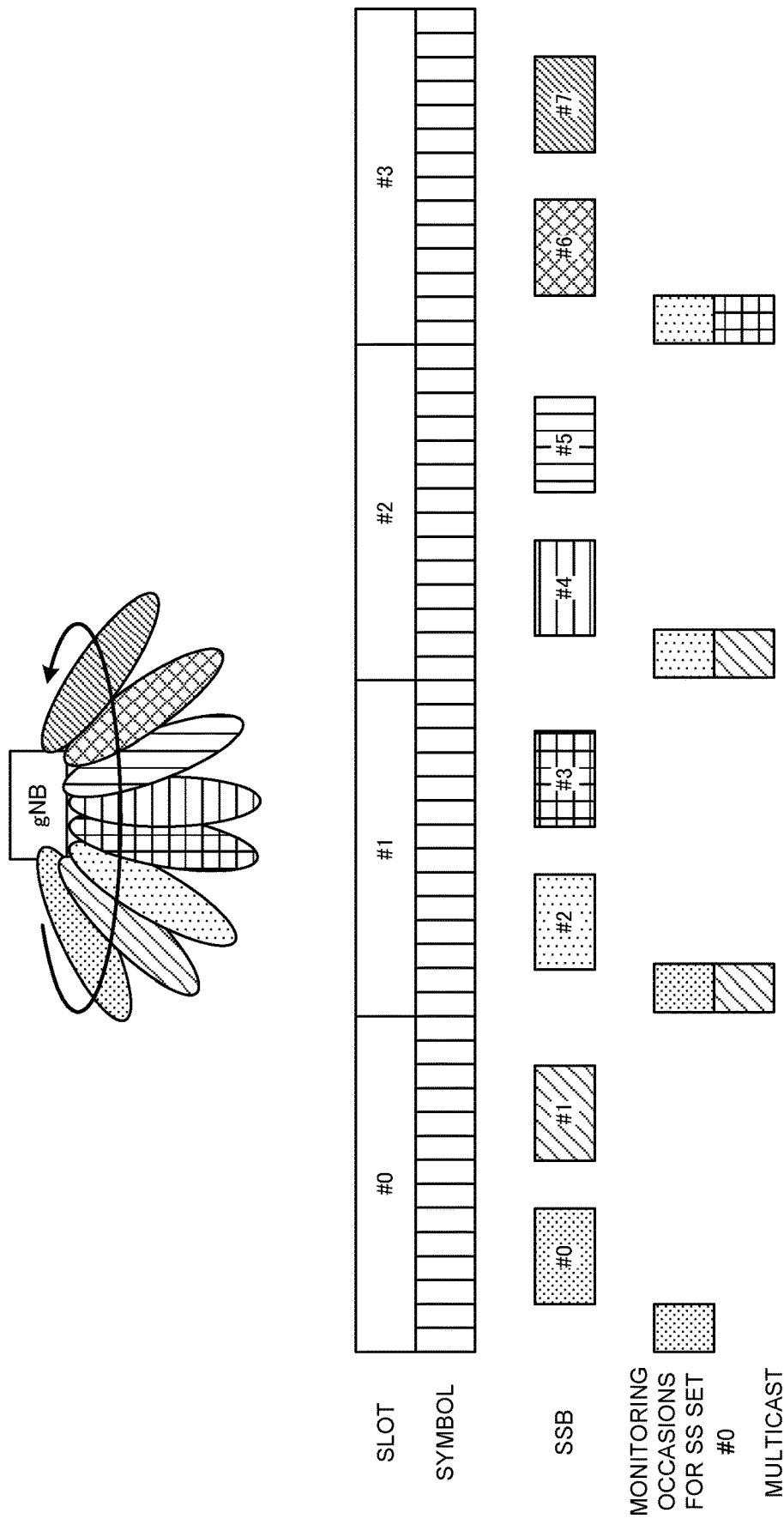
FIG. 11 is a diagram to show an example of default monitoring according to a second aspect.

FIG. 11 is a diagram to show an example of default monitoring according to the second aspect. In FIG. 11, for example, SSBs with different indices (here, SSBs #0 to #7) are transmitted (beams #0 to #7 and SSBs #0 to #7 are associated with each other) with use of a plurality of beams (here, beams #0 to #7) from the base station (e.g., gNB).

As shown in FIG. 11, the base station may apply beam cycling (also referred to as beam sweeping and so on) that switches a transmit beam on the basis of time. For example, in FIG. 11, SSBs #0 to #7 are each constituted by 4 symbols, are transmitted in different time by using different beams.

The base station may transmit the PDCCH CRC-scrambled by the G-RNTI by using beams identical to those of SSBs #0 to #7. The UE may control reception of the PDCCH with an assumption that a detected SSB is in a Quasi-Co-Location (QCL) relationship with the PDCCH (or demodulation reference signal (DMRS) for the PDCCH).

Here, QCL is an indicator indicating statistical properties of at least one of the signal and channel (signal/channel). For example, when a certain signal/channel and another signal/channel are in a relationship of QCL, it may be indicated that it is assumable that at least one of Doppler shift, a Doppler spread, an average delay, a delay spread, and a spatial parameter (e.g., a spatial reception parameter (spatial Rx parameter)) is the same (the relationship of QCL is satisfied in at least one of these) between such a plurality of different signals/channels.

Note that the spatial reception parameter may correspond to a receive beam of the UE (e.g., a receive analog beam), and the beam may be identified on the basis of spatial QCL. The QCL (or at least one element in the relationship of QCL) in the present disclosure may be interpreted as sQCL (spatial QCL).

Information indicating a reference signal (RS) in the QCL relationship with the DMRS for the PDCCH may be referred to as a transmission configuration indicator (TCI) state (TCI state) and so on.

Note that in FIG. 11, monitoring occasions for SS set #0 are provided in certain periodicity. For example, in FIG. 11, two leading symbols of each slot are configured as the monitoring occasions for SS set #0. Each monitoring occasion may be associated with a certain SSB index in accordance with a certain rule.

The UE may receive the MTCH (multicast data) via a PDSCH scheduled by DCI detected in each monitoring occasion. Specifically, the UE in the idle/inactive state may control reception of the PDSCH assuming (presuming) that an DMRS for the PDSCH is in the QCL relationship with a detected SSB.

<<SS Set Other than SS Set #0>>

When the SS set to monitor the PDCCH CRC-scrambled by the G-RNTI is an SS set other than SS set #0, the UE in the idle/inactive state may monitor the SS set in PDCCH monitoring occasions determined on the basis of association (so-called non-default association) between an SSB to be actually transmitted and PDCCH monitoring occasions.

The non-default association may be determined on the basis of information (e.g., an RRC parameter "ssb-PositionsInBurst") in SIB 1.

Figure 12:
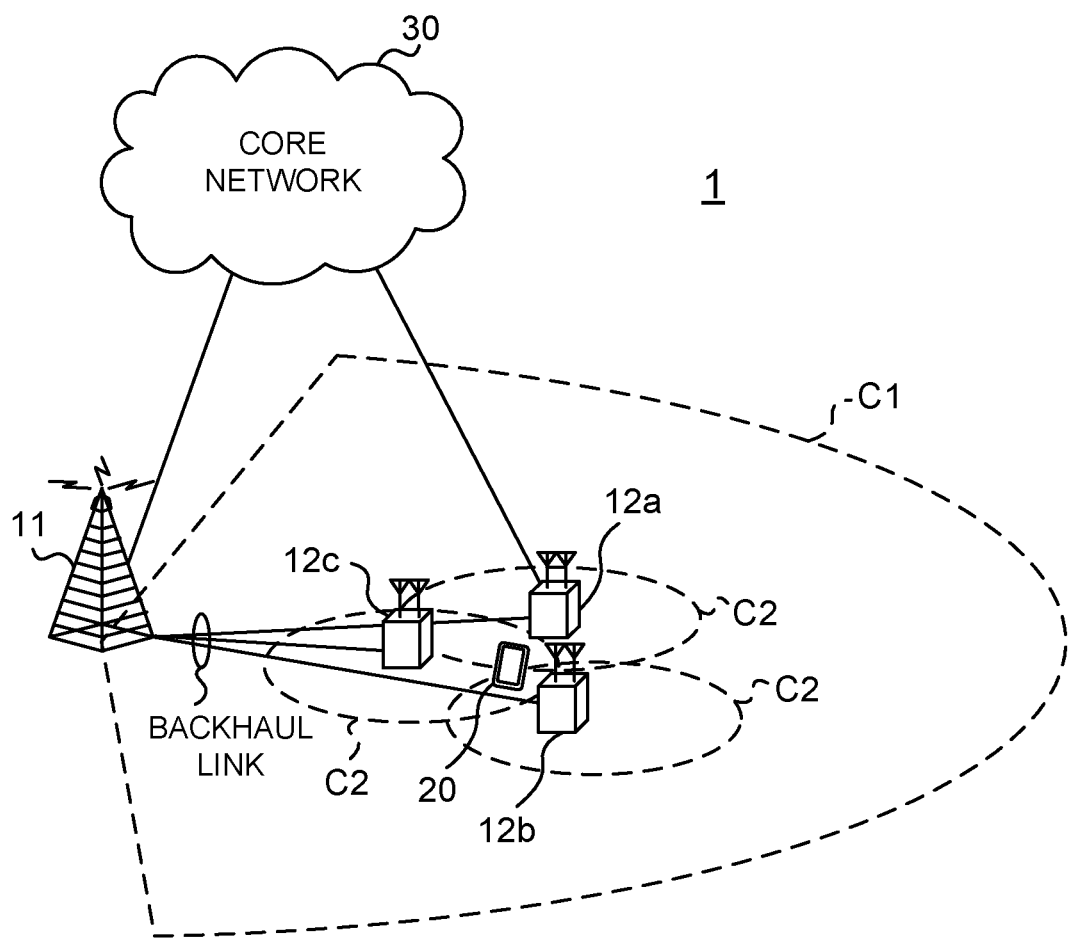
FIG. 12 is a diagram to show an example of a schematic structure of a radio communication system according to one embodiment.

FIG. 12 is a diagram to show an example of non-default monitoring according to the second aspect. In FIG. 12, an SSB to be actually transmitted from the base station may be determined on the basis of the information (e.g., the RRC parameter "ssb-PositionsInBurst") in SIB1. The UE may monitor the above-described PDCCH in monitoring occasions associated with the determined SSB.

<UE in Connected State>

The SS set to monitor the PDCCH CRC-scrambled by the G-RNTI may be SS set #0, or may be an SS set other than SS set #0.

<<SS Set #0>>

When the SS set to monitor the PDCCH CRC-scrambled by the G-RNTI is SS set #0, the UE in the connected state may monitor the SS set #0 in PDCCH monitoring occasions determined on the basis of association (so-called default association) between an SSB index and PDCCH monitoring occasions. In this case, it is only necessary that the UE in the connected state operates in a manner as described in FIG. 11.

<<SS Set Other than SS Set #0>>

When the SS set to monitor the PDCCH CRC-scrambled by the G-RNTI is an SS set other than SS set #0, the UE in the connected state may monitor the SS set in PDCCH monitoring occasions determined on the basis of SS configuration information (e.g., an RRC parameter "SearchSpace," see FIG. 9) for the SS set.

Specifically, the UE may determine the PDCCH monitoring occasions on the basis of information (e.g., an RRC IE "monitoringSlotPeriodicityAndOffset") indicating periodicity and offset of monitoring occasions included in the SS configuration information for the SS set and information (e.g., an RRC IE "duration") indicating duration of the monitoring occasions (see FIG. 9).

The TCI state used for reception of the PDCCH for the SS set may be determined on the basis of a CORESET associated with the SS set. The CORESET may be specified by, for example, a CORESET ID (e.g., an RRC IE "controlResourceSetId") included in the SS configuration information for the SS set.

[CORESET #0]

When the CORESET associated with the SS set is a CORESET with index 0 (CORESET #0), the UE may assume (determine) that one or more DMRS antenna ports (DMRS ports) for a PDCCH received in this CORESET #0 are quasi co-located (QCL) with one or more reference signals (RSs) configured by the TCI state.

The RS may be an RS (or RS resource) configured by a TCI state for the CORESET, and may be, for example, a channel state information reference signal (CSI-RS) (CSI-RS resource) or SSB. The TCI state may be a TCI state activated by a MAC control element (CE).

Alternatively, the RS may be an SSB (SS/PBCH block) acknowledged in the most recent random access procedure that has not been initiated in PDCCH order. The random access procedure may be procedure that triggers non-contention-based random access procedure. The SSB acknowledged in the most recent random access procedure may be used as the RS when the MAC CE to indicate the TCI state activation for the CORESET is not received after the most recent random access procedure.

[CORESET Other than CORESET #0]

When the CORESET associated with the SS set is a CORESET other than a CORESET with index 0, as long as a single TCI state is given to the CORESET or one of a plurality of TCI states given to the CORESET is activated by the MAC CE, the UE may assume (determine) that one or more DMRS antenna ports (DMRS ports) for a PDCCH received in the CORESET are quasi co-located (QCL) with one or more RSs configured by the TCI state.

Otherwise, for example, when the TCI state for the CORESET is not configured or when the TCI state for the CORESET is configured, but the activation is not performed by the MAC CE, the UE may assume (determine) that one or more DMRS antenna ports (DMRS ports) for a PDCCH received in the CORESET are quasi co-located (QCL) with an SSB identified in initial access procedure.

For example, a configuration of the TCI state for the CORESET is given as part of Reconfiguration with Sync procedure (e.g., handover, SCell addition procedure, and the like), but when the activation is not performed by the MAC CE, the UE may assume (determine) that one or more DMRS antenna ports (DMRS ports) for a PDCCH received in the CORESET are quasi co-located (QCL) with an SSB or CSI-RS resource identified during random access procedure initiated by the Reconfiguration with Sync procedure.

According to the second aspect above, the UE can appropriately control monitoring of the PDCCH scrambled by the G-RNTI.

Other Aspects

When succeeding in decoding a PDCCH to schedule a PDSCH (also referred to as multicast data, multicast transmission, and so on) associated with an MTCH, the UE may discontinue monitoring in remaining monitoring occasions configured for a PDCCH to schedule a PDSCH to transfer the same multicast message (e.g., at least one of an MTCH and an MCCH).

Discontinuation of the monitoring in the monitoring occasions may be applied to only the UE in the idle/inactive state, or may be applied to both the idle/inactive state and the connected state.

The UE in the connected state may continue, on the basis of the above-described SS configuration information, monitoring in the remaining monitoring occasions configured for the PDCCH to schedule the PDSCH to transfer the same multicast message (e.g., at least one of an MTCH and an MCCH).

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

FIG. 12 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 13:
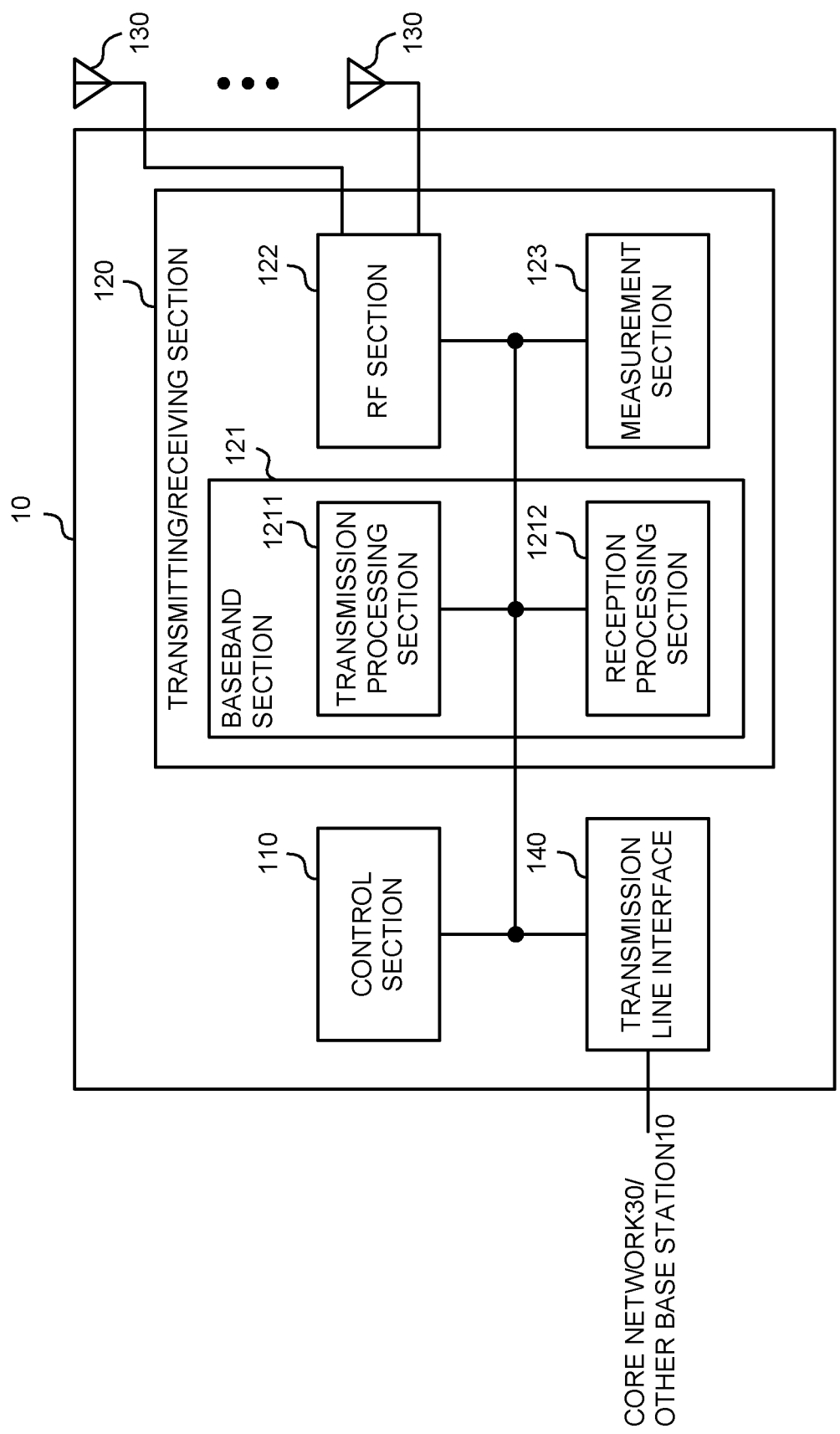
FIG. 13 is a diagram to show an example of a structure of a base station according to one embodiment.

FIG. 13 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit, commonly to or independently of a plurality of traffic types, information (RBG size information) indicating a configuration used for a determination of a size of a resource block group (RBG) used for allocation of a frequency domain resource for a downlink shared channel or an uplink shared channel.

The transmitting/receiving section 120 may transmit downlink control information (physical downlink control channel). The transmitting/receiving section 120 may transmit a downlink shared channel. The transmitting/receiving section 120 may transmit cell-specific or terminal-specific configuration information (the above-described cell-specific PDCCH information or UE-specific PDCCH information) related to the physical downlink control channel.

(User Terminal)

Figure 14:
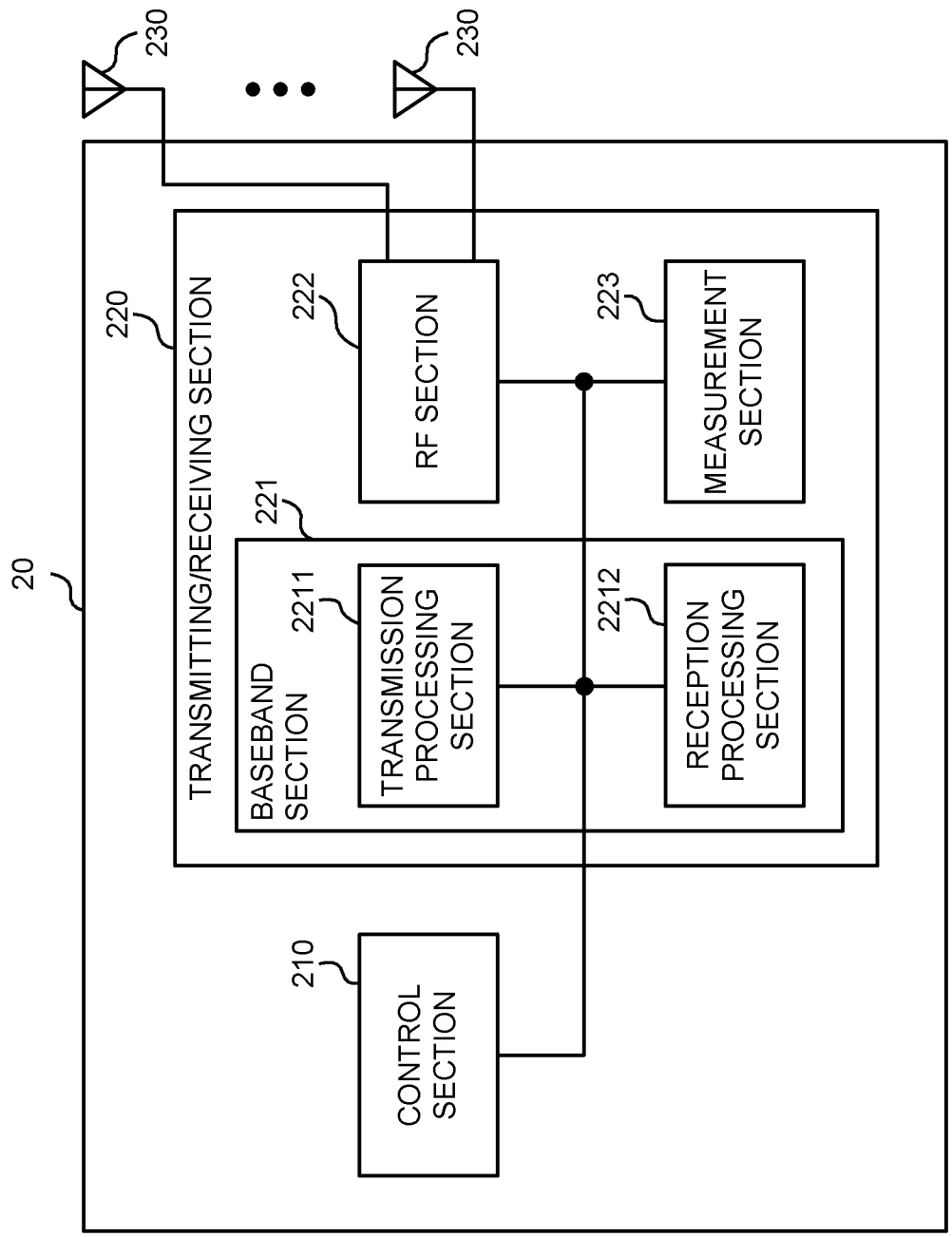
FIG. 14 is a diagram to show an example of a structure of a user terminal according to one embodiment.

FIG. 14 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the communication path interface 240.

Note that the transmitting/receiving section 220 may receive, commonly to or independently of a plurality of traffic types, information (RBG size information) indicating a configuration used for a determination of a size of a resource block group (RBG) used for allocation of a frequency domain resource for a downlink shared channel or an uplink shared channel.

The transmitting/receiving section 220 may receive downlink control information (physical downlink control channel). The transmitting/receiving section 220 may receive a downlink shared channel. The transmitting/receiving section 220 may receive cell-specific or terminal-specific configuration information (the above-described cell-specific PDCCH information or UE-specific PDCCH information) related to the physical downlink control channel.

The control section 210 may control, on the basis of the configuration information, a configuration of a search space set to monitor a physical downlink control channel to schedule a physical downlink shared channel associated with a multicast traffic channel.

The search space set may be associated with a multicast-specific control resource set, a common control resource set configured on the basis of the cell-specific configuration information, or a control resource set configured on the basis of the terminal-specific configuration information.

The control section 210 may control reception of the physical downlink control channel assuming that a demodulation reference signal for the physical downlink control channel is in a quasi-co-location relationship with a certain reference signal. When the terminal is in an idle state or an inactive state, the certain reference signal may be a synchronization signal block. When the terminal is in a connected state, the certain reference signal may be a synchronization signal block or a channel state information reference signal.

The control section 210 may control, on the basis of the physical downlink control channel, reception of a physical downlink shared channel associated with a multicast traffic channel.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 15:
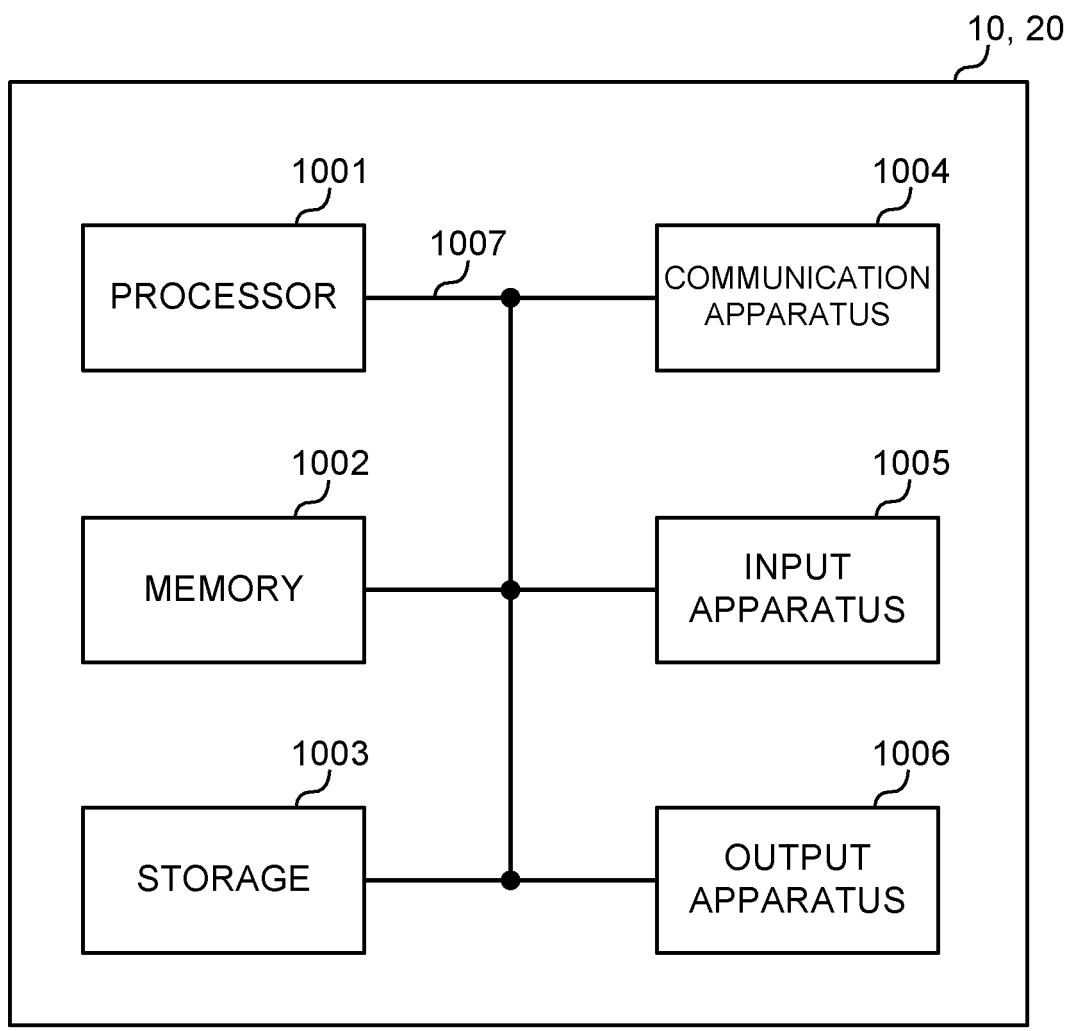
FIG. 15 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 15 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a receiver that receives cell-specific or terminal-specific configuration information related to a physical downlink control channel that schedules a physical downlink shared channel that is associated with a multicast traffic channel; and
   a controller that controls, on the basis of the configuration information, a configuration of a search space set to monitor the physical downlink control channel,
   wherein, when the terminal is in an idle state, the controller controls to receive the physical downlink control channel assuming that a demodulation reference signal for the physical downlink control channel is in a quasi-co-location relationship with a synchronization signal block, and
   the idle state is a state in which a radio resource control (RRC) connection is not established.

2. The terminal according to claim 1, wherein
   the search space set is associated with a multicast-specific control resource set, a common control resource set configured on the basis of the cell-specific configuration information, or a control resource set configured on the basis of the terminal-specific configuration information.

3. The terminal according to claim 1, wherein, when the terminal is in an inactive state, the controller controls reception of the physical downlink control channel assuming that a demodulation reference signal for the physical downlink control channel is in a quasi-co-location relationship with the synchronization signal block.

4. A radio communication method for a terminal, the radio communication method comprising:
   receiving cell-specific or terminal-specific configuration information related to a physical downlink control channel that schedules a physical downlink shared channel that is associated with a multicast traffic channel; and
   controlling, on the basis of the configuration information, a configuration of a search space set to monitor the physical downlink control channel, wherein, when the terminal is in an idle state, controlling to receive the physical downlink control channel assuming that a demodulation reference signal for the physical downlink control channel is in a quasi-co-location relationship with a synchronization signal block, and the idle state is a state in which a radio resource control (RRC) connection is not established.

5. The terminal according to claim 2, wherein, when the terminal is in an inactive state, the controller controls reception of the physical downlink control channel assuming that a demodulation reference signal for the physical downlink control channel is in a quasi-co-location relationship with the synchronization signal block.

6. A system comprising a terminal and a base station, wherein:

the terminal comprises:
   a receiver that receives cell-specific or terminal-specific configuration information related to a physical downlink control channel that schedules a physical downlink shared channel that is associated with a multicast traffic channel; and
   a controller that controls, on the basis of the configuration information, a configuration of a search space set to monitor the physical downlink control channel,
   wherein, when the terminal is in an idle state, the controller controls to receive the physical downlink control channel assuming that a demodulation reference signal for the physical downlink control channel is in a quasi-co-location relationship with a synchronization signal block, and
   the idle state is a state in which a radio resource control (RRC) connection is not established, and the base station comprises:
   a transmitter that transmits, to the terminal, the cell-specific or the terminal-specific configuration information.

* * * * *